United States Patent
Bukimer

(10) Patent No.: US 8,452,003 B2
(45) Date of Patent: May 28, 2013

(54) POWER SAVING TECHNIQUE FOR TELEPHONY ACCESS NETWORKS

(75) Inventor: Shalom Bukimer, Holon (IL)

(73) Assignee: ECI Telecom, Ltd., Petach Tikva (IL)

( * ) Notice: Subject to any disclaimer, the term of this patent is extended or adjusted under 35 U.S.C. 154(b) by 210 days.

(21) Appl. No.: 12/997,097

(22) PCT Filed: Jun. 11, 2009

(86) PCT No.: PCT/IL2009/000579
§ 371 (c)(1),
(2), (4) Date: Dec. 9, 2010

(87) PCT Pub. No.: WO2009/153778
PCT Pub. Date: Dec. 23, 2009

(65) Prior Publication Data
US 2011/0116621 A1 May 19, 2011

(30) Foreign Application Priority Data
Jun. 17, 2008 (IL) .......................................... 192261

(51) Int. Cl.
*H04M 1/00* (2006.01)
*H04M 9/00* (2006.01)
(52) U.S. Cl.
USPC ...................................................... 379/413
(58) Field of Classification Search
USPC ............................................................ 379/413
See application file for complete search history.

(56) References Cited

U.S. PATENT DOCUMENTS

| 2003/0202655 A1 | 10/2003 | Nattkemper et al. |
| 2004/0120512 A1* | 6/2004 | Ploumen et al. ............... 379/413 |
| 2005/0147237 A1* | 7/2005 | Mills .............................. 379/413 |
| 2007/0064880 A1 | 3/2007 | Mallya et al. |

FOREIGN PATENT DOCUMENTS

| EP | 0 814 620 A2 | 12/1997 |
| WO | WO 0039994 A1 | 7/2000 |

OTHER PUBLICATIONS

"Public Switched Telephone Network (PSTN); Network Termination Point (NTP) analogue interface; Specification of physical and electrical characteristics at a 2-wire analogue presented NTP for short to medium length loop applications", ETSI Guide, ETSI EG 201 188 V1.2.1, Jan. 2000, pp. 1-22.
"Access and Terminals (AT); Public Switched Telephone Network (PSTN); Harmonized specification of physical and electrical characteristics at a 2-wire analogue presented Network Termination Point (NTP)", ETSI Standard, ETSI ES 201 970 V1.1.1, Aug. 2002, pp. 1-25.

* cited by examiner

*Primary Examiner* — Alexander Jamal
(74) *Attorney, Agent, or Firm* — Browdy and Neimark, PLLC

(57) ABSTRACT

Technique is proposed for managing total power consumption in an access network comprising two or more interface modules serving a plurality of subscriber lines, the technique comprises performing a study of real power consumption of the subscriber lines in the access network on a line-to-line basis, correlating results of the study with inventory information concerning allocation of the subscriber lines to the interface modules and power consumption ensured by said modules to the lines and, based on the correlation, assessing optimality of allocation of the subscriber lines to the interface modules.

14 Claims, 2 Drawing Sheets

POWER SAVING TECHNIQUE FOR TELEPHONY ACCESS NETWORKS

FIELD OF THE INVENTION

The invention relates to communication networks, more precisely to solutions dealing with power consumption in access systems and is applicable both to "plain old telephony service" networks (POTS, PSTN) and to Next Generation Networks (NGN), for example to Multi-Service Access Nodes (MSAN).

BACKGROUND OF THE INVENTION

Conventional PSTN telephony systems traditionally utilize conservative basic implementations and rigid national specifications. The common practice for many years was that of powerful monopolies, usually state owned, and it was characterized by total control on the network; according to the common practice, the best grade of service was required and ensured. However, looking at the power consumption issue at least in respect of "Plain Old Telephony Service" (POTS) lines, the conventional access systems are far from being optimal for the following reasons:

In many cases, a national specification refers to all lines uniformly, so all telephony lines are powered according to the principle "one size fits all". (E.g., the ETSI EN 300 001 specification, summarizing the legacy analog subscriber characteristics for many European countries, or the Telcordia GR57CORE.001, GR303CORE.004, etc. that provides the legacy analog subscriber characteristics for North America.)

Only a recent new set of harmonized ETSI specifications, such as EG 201 188, ES 201 970, TS 102 971, etc. address different telephony line categories (i.e., Long lines or Short/Medium lines which should preferably be powered differently).

Usually, a common Battery rail (power bus and DC power source) feeds all telephony line cards and all lines on a specific card via their respective Subscriber Line Interface Circuits (SLICs, usually with the voltage of −48V, or with the voltage of −60V in some cases).

Inefficient old SLIC designs are still in use, designed to feed worst-case phones (that are rarely used these days). The same also applies to the Ringing voltage whose characteristics stem from old-fashioned and rarely found mechanical phones.

Even newer SLIC designs often use the conventional Constant-current mode that usually results in consuming constant power from the battery (power source) at the Off-hook state of the telephony line, regardless of the loop (line) length. (It should be kept in mind that the line is active—i.e., is power-feeding—at the Off-hook condition. However, a small yet constant quiescent power is consumed at any condition).

Modern telephony line cards are usually fully programmable, allowing them to be configured to any specific set of national parameters such as: Transmission parameters, Tone and Ring patterns, Signaling, and some Loop characteristics on a per channel basis. However, the battery feed characteristics are exceptional in that they are not tailored for each channel individually because of excessive space and cost issues.

At the same time, in practice seldom is the case that most of the lines connected to a specific line card fall under the same category/have similar loop lengths. On the contrary, given today's high density cards and the normal distribution of loop length—it is fair to see that out of ~100 subscriber lines per line-card statistically only 5-10% have the maximal length. For example, a service provider may have a 'Long' (loop <2000Ω) and 'Normal' (loop <1500Ω) line categories, for which a $V_{bat}$ Range value of −60V or −48V is chosen, respectively. Under the previous loop distribution assumptions, 90-95% of the lines will not use the predetermined $V_{bat}$ Range optimally, wasting 100-200 mW per active channel (It should be kept in mind that the channel is active—i.e., power-feeding—at the Off-hook condition). Upon multiplying this value by the Erlang figure (Erlang defines the statistical utilization of lines over a given period), one may obtain the average amount of power wasted in any access network. It should be kept in mind that access networks are permanently growing.

One of the major sources of PSTN power consumption is the SLICs' quiescent current consumed from Vbat during the Idle state (On-hook). Usually, $V_{a-b(on-hook)}$ is defined in an all-purpose National specification (typically −48V), however most Terminal Equipment elements (TEs) may function perfectly with a significantly lower voltage (i.e., some documents even state it, for example GR57 #5.3.8 requires: "on hook voltage>21Vdc").

And yet another (minor) source of power, wasted in telephone networks, is found in the Ringing state. Usually, the Ringing Voltage $V_{a-b(Ring)}$ is defined in an all-purpose National specification (typically ~80 Vrms), however most lines are relatively short and a significantly lower Ringing voltage value may be configured for them.

In contemporary access networks, Voice (telephony) line cards are housed in shelves and racks that are shared by several other services such as xDSL, PON, etc. They are usually aggregated into (in communication with) a common packet network such as IP or ATM, controlled by smart traffic-management tools and managed by a common Management system.

Modern telecom systems, especially in the access part of the network, have ever-growing power demands. This fact disagrees with the operators' need to lower their OPEX (operational expenses, i.e. electricity bills), and the vital general need of power efficiency (due to global warming, etc.). Claudio Bianco et al in the paper "Energy consumption trends in the Next Generation Access Network—a Telco perspective", states that the electrical energy needed by the Telecom Italia's Network is more than 2,000,000,000,000 Wh(>2 TWh), representing nearly 1% of the total National energy demand, second user only to the National Railways. Electrical energy consumption for Telecom Italia's (TI) fixed network represents roughly 80% of the total TI network consumption. Similar numbers are actual for many other countries having a developed copper lines infrastructure ("Copper plant").

US 2003/0202655 describes a system for managing power from a power source for at least one line powered network element in an access network. The system includes a power manager that establishes at least one power criterion for the at least one network element. Further, the system includes a power controller that is responsive to the power manager. The power controller and the power manager communicate to manage operation of the at least one network element based on the at least one power criterion and deals with cases where the power consumed by a line exceeds a predetermined threshold, or where another irregular situation takes place.

It should be noted that neither of the discussed prior art references takes care of regular situations, standard for the ordinary way of access networks' operation. Namely, neither of the solutions known to the applicant seems to take care of excessive power conventionally wasted during on-hook and/ or off-hook states of telephony communication lines due to feed characteristics not optimized with respect to their line lengths (=line resistance).

OBJECT OF THE INVENTION

It is therefore the object of the present invention to provide tools for monitoring and assessing efficiency of access networks, more specifically—tools allowing systematic reduction of power consumption in any access network.

SUMMARY OF THE INVENTION

The principle of the invention is to create a tool capable of performing a study of power consumption status in an access network on the line-to-line basis, capable of presenting the results to a network operator/computer program and then, by considering some specific network characteristics, capable of producing suggestions how to optimize allocation of the access network lines (Subscriber lines) between equipment modules serving the lines, so as to reduce the total power consumption considerably, thus saving money, and reducing environmental effects.

The principle solution is optimizing the line-modules (line-card, line-rack, line-shelf, etc.) allocation by systemized concentration of 'Long' lines on their dedicated modules, 'Normal' lines on their dedicated line cards, etc., wherein the systemized concentration is being based on a) study of the existing allocation, b) study of power consumption status, and c) judicious grouping of the lines.

At the end of the process according to the invention, the network management/operator will have means to ensure and will preferably ensure that one or more equipment modules in the access network (say, a line card):

has a power source (say, a battery) with such a value of VbatRange, that attributes the card to a specific line type category (such as: 'Extra long', 'Normal' etc.) and ensures the voltage and the power for the maximal length of line in that specific category, and is indeed connected only, or at least mainly, to lines of that specific line type category.

The above object can be achieved by providing a method for managing/reducing total power consumption in an access network comprising two or more (usually collocated) interface modules serving a plurality of subscriber lines, the method comprises performing a study/check (preferably, automatically) of real power consumption of the subscriber lines in the access network on a line-to-line basis, correlating results of the study with inventory information concerning allocation of the subscriber lines to the interface modules and power consumption ensured by said modules to said lines, and assessing, based on said correlation, optimality of allocation of the subscriber lines to the interface modules (which may include assessing possibilities of changes for reducing the total power consumption).

More specifically, the Inventor proposes a method for managing/reducing power consumption in an access network comprising a plurality of subscriber lines presently served by a number of interface modules (the modules being, for example, line cards, racks, shelves, etc.), wherein each of the modules being powered by a power source (say, a battery bus) providing a predetermined maximal value of ensured power consumption per line (EPC) served by the module (the pre-determined maximal ensured power consumption can be defined, say, by a predetermined maximal voltage VbatRange ensured by the power source per line of the module) and wherein at least two different values of the ensured power consumption per line EPC (or two VbatRange values) are predetermined for the access network;

the method comprising:

for each of the modules, forming inventory information about value of its ensured power consumption per line (EPC) and about specific lines, out of said plurality, served by said module;

for each line of the plurality, performing the study/check that includes:

obtaining information characterizing real power consumption of the line (RPC) at least at one of the following conditions: at Off-hook condition, at On-hook condition, and accumulating said obtained information; (the obtained information may be presented by at least one measured or calculated parameter among: length of the line, ohmic resistance of the line, maximal power consumption of the line, required battery voltage range for the line, and the like);

correlating said accumulated information with the inventory information formed for each of the modules;

based on results of said correlation, performing at least one of the following two operations:

judging about effectiveness of current arrangement at least at one of said modules by assessing suitability of the value of ensured power consumption per line (EPC) in said module to the real power consumption (RPC) at said specific lines currently served by said module;

recommending a new arrangement allowing, for at least two of said modules, more effective utilization of their ensured power consumption per line (EPC); wherein the new arrangement being formed by selecting from said plurality of lines such a group of lines to be served by said module, that the real power consumption (RPC) at any line of said group be maximally close to the ensured power consumption per line (EPC) of said module.

Preferably, the real power consumption RPC is studied by obtaining parameters characterizing RPC at the Off-hook condition.

Alternatively or additionally, the method may comprise obtaining parameters characterizing RPC at the On-hook condition.

Most preferably, for each of the modules, the per line On-hook condition shall be studied in comparison with the Off-hook condition, and used as an additional constraint on a VbatRange value, namely:

the higher voltage of the on-hook and off-hook conditions shall be recommended as VbatRange value (the higher RPC is used for selecting module and EPC).

To minimize this unavoidable power consumption, we have to make sure that the SLICs of the modules are configured to use the lowest Vbat that still complies with "Min $V_{a-b(on-hook)}$".

Based on the 'line length' (or the like) assessed by the line module for each line and taking into consideration network specific line/terminal equipment characteristics, an optimized Ring signal level can be determined per subscriber line. These per-line levels can be further used to recommend changes of the SLIC Ring voltage; in practice, they can be sent to the line module and used to adjust the module (say, to re-program the Ring voltage for each channel's SLIC).

The proposed expression for determining a Vbat value suitable for the on-hook condition is: Vbat>"Min(required) $V_{a-b(on-hook)}$"+8V.

The proposed expression for determining a suitable $V_{a-b\,(Ring)}$ value is:

$$V_{a\text{-}b(Ring)} > \left\{ \left[ \frac{\text{"Min } Vring\text{"}}{Z_{REN}/(\text{"No of } REN\text{"})} * Rline \right] + \text{"Min } Vring\text{"} \right\}$$

where:

MinVring—minimal Ring voltage required for proper operation;

$Z_{REN}$—impedance of REN value, of one standard phone;

No of REN—network requirement, max number of allowed RENs per line

Rline—line length (in resistance)

The method may further comprise an intermediate step of processing the accumulated information (obtained for all the lines of said plurality) by grouping the lines according to values of the real power consumption of a line (RPC).

A new arrangement can be proposed if, for a specific module, percentage of lines presently served by the specific module and having RPC sufficiently close to EPC (i.e., really consuming the predetermined value of power consumption ensured by the module) is lower than a preselected threshold. In the new arrangement, therefore, the similar percentage, at least in that specific module, should be higher than said threshold.

In practice, the proposed new arrangement may require a step of re-wiring some of the lines to different modules and/or changing the predetermined maximal value of power consumption ensured by a specific module (say, by adjusting the battery of the module to another predetermined VbatRange accepted for the access network).

The above step of changing the predetermined value of power consumption ensured by a specific module can be implemented if the module has a configurable $V_{bat}$Range value thus allowing accommodation of the card to one or another type of the line category (such as: 'Extra long', 'Normal' etc.).

The method may additionally comprise arranging a power feeding block for one or more interface module (preferably, of a line card) in the access network, adapted to generate more than one battery voltage values on board (say, two or three related values such as $V_{bat}$Range=$V_{bat}$×100% being the maximal value; /$V_{bat}$×75%; /$V_{bat}$×50%) and providing a SLIC of each telephony line being operative to select the most appropriate value at its Off hook/On hook condition 'on the fly'.

The method may further comprise presentation of optimality/effectiveness of the line-to-module allocation (preferably, a graphical presentation both for the current arrangement and the proposed new arrangement).

The step of forming the inventory information about each of the interface modules supposes that a service provider/operator keeps inventory data on numbers and parameters of the interface modules (i.e., types, serial numbers and programmed values), as well as on numbers and parameters of the subscriber lines and terminal equipment pieces TEs, and preferably forms a computerized data base which will be called a first data base or an inventory data base. The data base of subscriber lines and TEs shall preferably hold default values for the above-mentioned parameters, though should allow the service provider to reprogram them at will.

The checking step (of obtaining, for each line of the plurality, the information characterizing real power consumption RPC of the line at Off-hook condition) can be executed either by periodically performed measurements or by automatic monitoring. The "real" information is accumulated in a second ("real") data base.

The check/study of the subscriber lines (for either on-hook or off-hook conditions) may be performed at various occasions, for example: checking all already outfitted lines at the current arrangement, checking at the new arrangement, checking only newly added lines, checking all the lines periodically (say, once or twice a year) with suitable rewiring, thus achieving periodic optimization of power consumption.

The access network should be understood as a combined next generation (NG) network comprising lines of Plain Old Service Telephony Service (POTS). Preferably, the newly proposed technique relates to the subscriber lines being conventional POTS lines. The real power consumption RPC of a specific POTS subscriber line can be represented by the line length and can be measured as the resistance of a Loop length of the copper pair serving that specific subscriber.

The proposed method may be utilized with any kind/generation of the network, as long as it: a) allows measuring and reading the power consumption characteristic (such as a line length) for its plurality of POTS lines, b) has a configurable power source with more than one voltage settings for the network, but preferably even per card.

According to another aspect of the invention, there is further provided a system for managing/reducing total power consumption in an access network comprising two or more (usually collocated) interface modules serving a plurality of subscriber lines, the system being provided with measuring means for checking real power consumption of the subscriber lines in the access network on a line-to-line basis, processing means for correlating results of the check with inventory information concerning at least allocation of the subscriber lines to the interface modules and power consumption ensured by said modules to said lines, and for assessing, based on said correlation, optimality of allocation of the subscriber lines to the interface modules (which may include assessing possibilities of changes for reducing the total power consumption).

More specifically, the system (serving as a "Power Saver Adviser", PSA) for managing power consumption in an access network, comprises said plurality of subscriber lines presently served by the two or more interface modules each providing a predetermined (maximal) ensured value of power consumption (EPC) per line, and wherein at least two different values of the ensured power consumption EPC are predetermined for the access network;

the system being capable of performing the method described above and comprising:

means for storing the inventory information concerning each of said interface modules, and at least value of maximal ensured power consumption per line (EPC) at the module and about specific lines, out of said plurality, served by said module;

said measuring means for obtaining information characterizing the real power consumption (RPC) of each of the plurality of subscriber lines of the access network at Off-hook condition of the lines (for example, such means may be circuits for measuring resistance of the subscriber lines, calculating the resistance based on other measurements, etc.), means for accumulating the obtained information on RPC associated with respective subscriber lines and interface modules;

said processing means for correlating said accumulated information with the inventory information formed for each of the modules and for performing at least one of the following two operations based on results of said correlation:

judging about effectiveness of current arrangement at least at one of said modules by assessing suitability of the value of ensured power consumption per line (EPC) in said module to the real power consumption (RPC) in Off-hook condition and/or in On-hook condition at said specific lines currently served by said module;

recommending a new arrangement allowing, for at least one of said modules, more effective utilization of its ensured power consumption per line (EPC); wherein the new arrangement being formed by selecting from said plurality of lines such a group of lines to be served by said module, that the real power consumption (RPC) at any line of said group be maximally close to the ensured power consumption per line (EPC) of said module.

Preferably, the processing means of the system is additionally designed for optimizing Ring signal level per line by assessing the real power consumption (RPC) per line and recommending changes in at least one module (or at least one SLIC channel).

The means for storing the inventory information is preferably an inventory data base which, for example, accumulates the provider's programmable line/TE characteristics and their default values. This information is needed, when considered together with the data collected from the interface modules, for recommendation of the ensured value of power consumption (EPC). The required (programmable, or default) line/TE characteristics may include, among others:
"Min $V_{on-hook}$"—The lowest On-hook line voltage required for proper CPE/TE operation (default value $-30\,V_{dc}$)
Ring Freq—The Ring signal frequency for line module (default value 25 Hz)
REN—Z (Impedance) and Ring frequency—(default value 3 KΩ@25 Hz)
No. of REN—Max No. of allowed RENs per line (default 3)
"Min $V_{ring}$"—Minimal Ring voltage required for proper ringer operation (default 35 $V_{rms}$)

The discussed subscriber lines are preferably "Plain Old Telephony Service" (POTS) lines. The checking function of obtaining information on RPC (i.e., the function of measurement) is usually performed by a Subscriber Line Interface Circuitry (SLIC) at each of the lines; the function of communication between the subscriber lines (actually, between SLICs of the lines) and the processing means (a computer) can be performed via a Management Interface Unit MIU placed, say, in a Central Office CO, in a street cabinet, in a digital signal lines access multiplexer DSLAM, etc. The SLICs of the subscriber lines are positioned at their associated interface modules (say, line cards), which cards may territorially be placed at the same management interface unit or remote from it.

The computer (the processing means) should preferably comprise a preliminarily formed inventory data base (a first data base) reflecting the existing status of the subscriber lines and modules serving the lines the preprogrammed line and TE parameters, a second data base for accumulating the information on RPC of the lines, and be provided with a program for correlating and analyzing data from the mentioned two data bases for further providing recommendations on a new power saving arrangement between the modules and the subscriber lines.

There is further provided a software product comprising computer implementable instructions and/or data for carrying the above-described method. The software product can be accommodated on a carrier medium (say, a hard disc of a computer, a portable diskette, etc.), which is intended for use in the above-described Power Saver Adviser.

BRIEF DESCRIPTION OF THE DRAWINGS

The present invention will be further described and illustrated with reference to the following non-limiting drawings, in which.

DETAILED DESCRIPTION OF PREFERRED EMBODIMENTS

As has been generally outlined in the Summary, the problem of essential reduction of power consumption in access networks can be resolved by providing operators of the access equipment with a system of tools which, in case the access network comprises POTS lines, are adapted to perform the following operations:

To measure: Say, the system is adapted to measure/assess the Loop length of a POTS Line on a per channel basis.

To form information data bases: The system is adapted to collect the information concerning line's length on a per-line, and continuous basis, and generate a "real" database. In practice, it is useful to generate a local database on each interface module (say, at a line-card). A central entity (say, a computerized operator's station) shall routinely collect the local information into a common "real" database. It should be noted that the local information concerning the lines length may reach the central entity directly, without being stored at local data bases. An inventory database comprising information about existing interface modules, their VbatRange and their subscriber lines should be preliminarily formed in the central entity.

To analyze/process: The system is adapted to assess the suitability of an allocated $V_{bat}$Range, with both On-hook and Off-hook criteria, for a specific card serving its lines (and similarly, to perform the same for each of the cards of interest).

The system is also adapted to assess the suitability of an allocated $V_{a-b(Ring)}$ for specific subscriber's lines (and similarly, to perform the same for each of the lines of interest).

It can be executed, say, by graphically indicating the percentage of lines, per card, that are close to be optimal for the allocated $V_{bat}$Range of the card, and $V_{a-b(Ring)}$ of the lines. It can be possible to expand the analysis/graphical presentation to SHELF, RACK, SITE levels, or any portion/geographical scale of an access network.

To suggest: If at least two cards or other modules exist in the analyzed network portion, the system is adapted to propose/suggest more efficient line allocation schemes per CARD, and in the analogous manner per SHELF/RACK/SITE etc.: e.g., the system is operative to recommend grouping of the subscriber lines according to common length categories so that the best suitability to $V_{bat}$Range be reached.

The system may also suggest changing/adjusting the $V_{bat}$Range per module/card.

The system is also adapted to propose/suggest more efficient or optimal values of $V_{a-b(Ring)}$ for specific subscriber's lines, located on a single or plurality of line modules.

The basic embodiment of the proposed method/system concerns plain old telephone service (POTS) interfaces.

Figure 1:
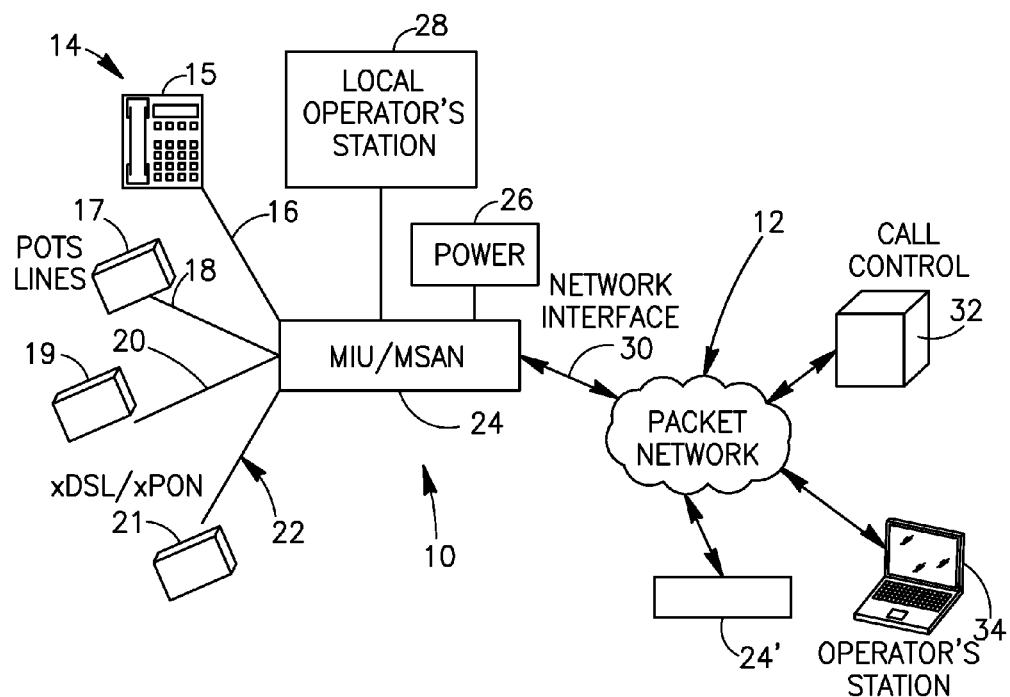
FIG. 1. Schematically illustrates a network to which the inventive system (Power Saver Advisor PSA) can be applied.

FIG. 1—illustrates a conventional, access network 10 connected to a packet network 12, which comprise elements that enable applying the proposed power saving technique. The following clauses refer to reference numerals and detail functions of the elements which will be relevant to our further description:

Subscriber Interface 14—(POTS I/F) comprises of a 2-wire subscriber's line (POTS Line 16, 18, 20) and a Terminal Equipment/Customer Premises Equipment (TE/CPE, such as telephone set, fax machine, 15, 17, 19 etc.). The Line and CPE together form a Loop which is characterized by ohmic resistance and, when at Off-hook condition, allows direct current (DC) to flow. The mentioned TE/CPE also incorporates a Ringer—providing an audible indication for incoming calls.

xDSL/xPON 21—Different than POTS subscriber's services using Copper or Fiber optics connection facilities (subscriber lines) 22, respectively and forming part of the access network 10.

Management&Interface Unit (MIU, or can be called Multi Service Access Node MSAN) 24 is part of the access network and serves a mediator between the access network 10 and the packet network 12.

MIU (MSAN) is an equipment element that houses the Subscriber's line circuitry SLIC and usually performs the so called 'BORCHT' functions (Battery feeding, Over voltage protection, Ringing, Signaling, Codec, Hybrid and Test), as well as power supplies, traffic management (payload handling) and equipment management functions MNGT. The equipment of MIU is assembled into electronic Cards of various sizes (including the most popular line cards), that are housed in various size and shape Shelves, that may be housed in equipment Racks or be Stand alone. The cards comprise associated data bases adapted for storing and updating power efficiency information. MIU (MSAN) may reside, for example, in a Central Office CO, in a street cabinet, in a digital signal lines access multiplexer DSLAM, etc. The MIU (MSAN) block is provided with a DC or AC power source 26 that usually has a battery backup. MIU may also contain a Local Operator's Station 28 (see also the description to the Central operator's station 34 below).

The MIU (MSAN) 24 interfaces to the subscribers via the Subscribers' lines (16, 18, 20, 22), The Packet network 12 (ATM, IP, etc.) via Copper or Fiber optic facilities 30 The MIU 24 usually has an In-band or Out-of-band management port (not shown) shared on the Network interface or being a separate connection. It should be noted that the access network 10 usually comprises more than one MIUs (MSANs), each connected to its own subscriber lines (see an additional block 24').

Network Interface 30—The physical layer may be of any kind: Electrical, Fiber optics or Wireless, and may use any appropriate framing method (Layer 2, such as: IP/Ethernet etc.).

The Network Interface carries all kinds of payloads that are served by the MSAN, such as Data, Video and Voice, as well as Signaling, Control and Management signals.

Call Control unit 32—A network element that is used to handle the Signaling part of the POTS service. Typical Call Control elements are: Legacy V5/GR303 Local Exchanges (a.k.a Local Exchange, Central Office), or Servers running Voice-over-Packet call control protocols such as H.248, MGCP, SIP, etc (a.k.a Soft Switch).

Central Operator's Station 34 (may exist together with the Local Operator's station 28 or as an alternative to it)—is a network-connected computer that is used to manage operations of the proposed Power Saver technique. The central station 34 is operative to gather power efficiency information stored in MSANs' local data bases, analyze the data as well as present it to the operator using various presentation methods, and if asked for—provide expert advices on more efficient allocations of the subscribers to line-cards, shelves, racks, etc. As has been mentioned, the operator's station may be run from a dedicated central computer, or be integrated into a local MSAN.

Figure 2:
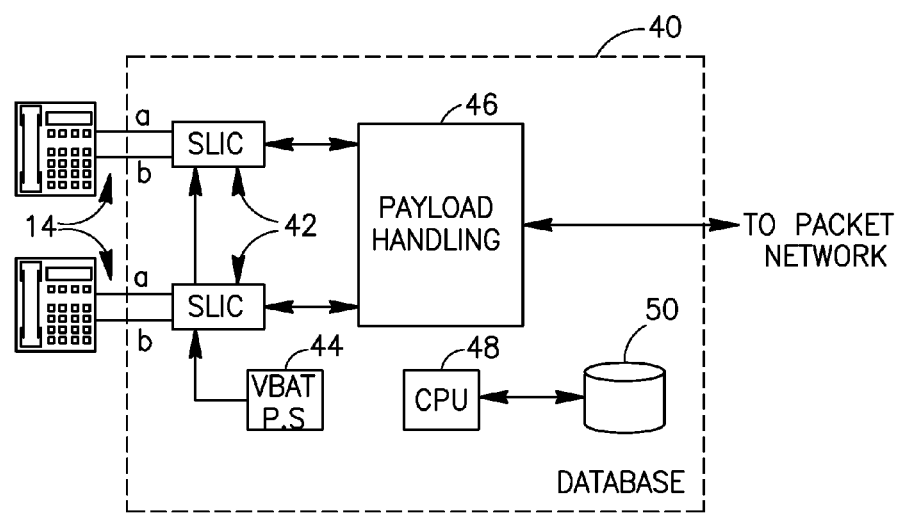
FIG. 2. Schematically illustrates components of a Telephony service line-card and their schematic connections with the power saver adviser (PSA).

FIG. 2—shows components of a Telephony service line-card 40 that can be utilized in implementing the proposed "Power Saver Advisor" technique.

Subscriber Line 14—(POTS interface I/F) comprises a 2-wire subscriber's line (POTS Line) and a Customer Premises Equipment (CPE, such as telephone set, fax machine, etc.).

SLIC 42 (only two SLICs are shown in the card 40)—The subscriber's line circuitry, includes the so-called 'BORCHT' functions (Battery feeding, Over voltage protection, Ringing, Signaling, Codec, Hybrid and Test).

The Inventors propose that each SLIC 42 measures resistance of its subscriber's line say, by measuring voltage between points a, b (Va-b) at Off-hook condition of the line. It is simple to measure and is a perfect indication of the Loop length. The measured value can then be stored in the card's local database (which usually exists at the line card, but was never used for the purpose herein described).

A power supply block 44 is schematically shown as providing Vbat voltage to all SLICs of the card 40.

The presently accepted and widely used architecture of a POTS line card is such that $V_{bat}$ (being supplied to lines by SLIC feed voltages) is configurable only at the start of the line card operation and is common to all subscriber lines of the card.

The power supply block 44 feeds the power requirements of the SLIC (e.g., Battery feed and Ringing).

The power consumed from the battery is divided into the quiescent power (at Idle or On-hook condition), the useful power developed across the Loop and the power that is wasted in the SLIC as heat (at Off-hook, at On hook), when the power supplied by the power source is greater than the really required power corresponding to the measured Va-b. The present invention aims to reduce the wasted power to a minimum. The line-card 40 may include a great number of POTS I/Fs (Typically, up to a hundred).

Payload Handling block 14 includes, digital signal processors (DSP) and peripherals which are responsible for: Codecs and payload conditioning, line-side signaling protocols, network-side signaling protocols, security, etc. required for handling data packets that arrive from the Packet Network to the subscribers of the Access Network and vise versa.

CPU block 48—includes a card controller (Control & Processing Unit+memory and other peripherals), which is responsible for: card control, Performance Monitoring (PM) and management. The CPU block is associated with a local Database 50. According to the proposed novel technique, the CPU shall periodically test the feed characteristics (the Line length/resistance/consumed voltage) for each line and gather this information into the local data base (DB 50). The database 50 will provide its stored information when interrogated by a local operator's station 28 or a central operator's station 34 (see FIG. 1).

Figure 3:
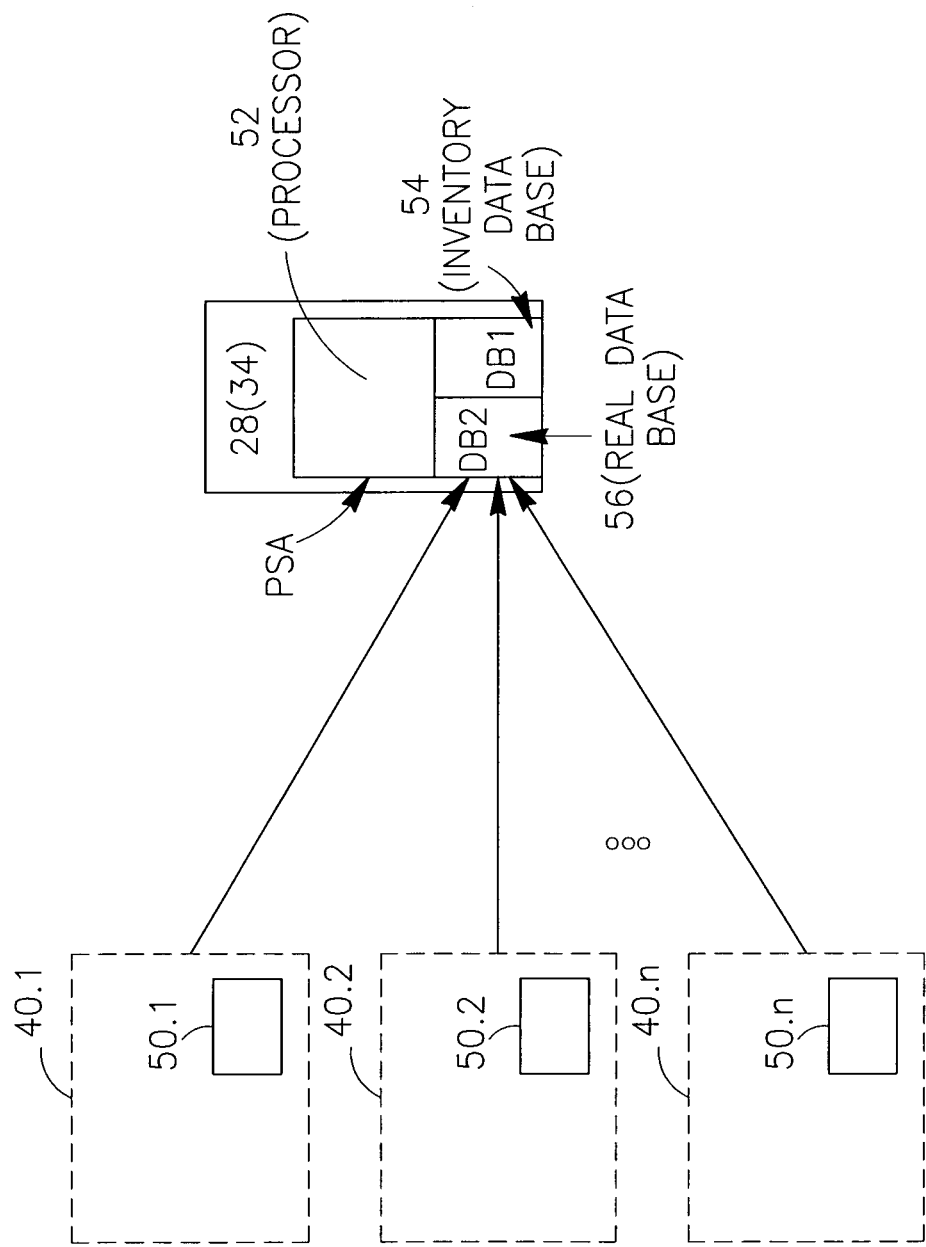
FIG. 3 schematically illustrates a block diagram of one embodiment of the inventive system (PSA).

FIG. 3 illustrates a schematic block diagram of the system comprising a Power Saving Adviser PSA. PSA is allocated in Operator's station 28 or 34, or within a dedicated computer (not shown), and comprises an Inventory Database 54 storing data about a current arrangement in the access network, a Real Database 56 storing data obtained from all local databases (50.1 ... 50.n) of interface modules 40.1 ... 40.n, and a processor 52 being actually a combined hardware/software tool and, with its associated databases DB1 and DB2 (inventory data base 54 and real data base 56), constituting the PSA.

The main novel function of the PSA is based on the "real" information obtained from local databases 50.1 . . . 50.*n* and constitutes correlating the "real" information with the inventory information; the correlation preferably includes grouping the subscriber lines, active in the access network, into a number of groups according to the value of RPC or any other parameter characterizing the RPC (the parameter may be the subscriber line length, its resistance, etc).

Based on that grouping, the PSA is capable of estimating whether a specific interface module (say, line card 40.1) serves optimally its subscriber lines, or it can be arranged to serve a group of lines which will better suit (more effectively consume) the power supplied by the module.

It should be noted that instead of interacting with local databases 50.1 . . . 50.*n*, the PSA of the Operator's station may be in direct communication with SLICs of the respective subscriber lines, thus collecting the necessary information directly to the database 56.

It should be appreciated that other configurations of the proposed system and other versions of the proposed method may be suggested which will be part of the invention as long as are covered by the claims which follow.

The invention claimed is:

1. A method for managing total power consumption in an access network comprising two or more interface modules serving a plurality of subscriber lines, the method comprises
performing a study of real power consumption RPC of the subscriber lines in the access network on a line-to-line basis,
grouping the subscriber lines according to values of the real power consumption RPC of a line,
correlating results of the study with inventory information concerning allocation of the subscriber lines to the interface modules and power consumption ensured by said modules to said lines, and,
based on said correlation, assessing optimality of allocation of the subscriber lines to the interface modules.

2. The method according to claim 1, further comprising:
for each of the interface modules, forming an inventory database comprising data about value of ensured power consumption (EPC) per line of said plurality subscriber lines, served by said module;
for each line of the plurality, performing said study by obtaining information characterizing its real power consumption (RPC) of the line at Off-hook condition and at On-hook condition, and accumulating said obtained information;
correlating results of said study with the inventory information by correlating said accumulated information with the inventory information formed for all of said modules;
assessing optimality of allocation of at least one subscriber line of the plurality of subscriber lines to a different interface modules
recommending a new arrangement allowing, for at least two of said modules, more effective utilization of their power.

3. The method according to claim 2, wherein the new arrangement is proposed for a specific interface module, when a percentage of subscriber lines presently served by the specific module having an RPC value close to EPC is lower than a preselected threshold, while in the new arrangement the similar percentage for the specific module is higher than said threshold, and wherein the new arrangement comprises re-wiring of one or more of the subscriber lines to one or more different interface modules.

4. The method according to claim 1, wherein the subscriber lines are "Plain Old Telephony Service" lines and wherein the RPC of a specific subscriber line is represented by length or by resistance of that specific subscriber line.

5. The method according to claim 1, wherein the step of performing a study comprises obtaining said parameters characterizing RPC at the Off-hook condition and at the On-hook condition, the method further comprising selecting therefrom the higher parameter.

6. A system for managing total power consumption in an access network comprising two or more interface modules serving a plurality of subscriber lines, the system comprising:
measuring means for checking real power consumption of the subscriber lines in the access network on a line-to-line basis,
processing means for
grouping the subscriber lines according to values of the real power consumption RPC of a line,
correlating results of the checking with inventory information concerning allocation of the subscriber lines to the interface modules and power consumption ensured by said modules to said lines, and for
assessing, based on said correlation, optimality of allocation of the subscriber lines to the interface modules.

7. The system according to claim 6 further comprises:
a first data base for storing inventory information concerning each of said interface modules, value of ensured power consumption (EPC) per line (EPC) at the module and about specific lines, out of said plurality, served by said module;
said measuring means for obtaining information characterizing RPC of each of the plurality of subscriber lines of the access network at Off-hook condition and/or On-hook condition of the lines;
a second data base for accumulating the obtained information on RPC associated with respective subscriber lines and interface modules;
said processing means for correlating said accumulated information from said first database and said second database, determining an effectiveness of current arrangement at least at one of said modules by assessing suitability of the value of EPC per line in said module to the RPC at said specific lines currently served by said module;
recommending a new arrangement allowing, for at least one of said modules, more effective utilization of its ensured power consumption per line EPC; wherein the new arrangement being formed by selecting from said plurality of lines such a group of lines to be served by said module, that the RPC at any line of said group be maximally close to the EPC per line of said module.

8. The system according to claim 6, wherein the processing means comprise a computer, while the system is further provided with a Management & Interface Unit (MIU) for communication between the measuring means and the processing means.

9. The system according to claim 7, wherein the processing means comprise said first data base and said second data base, and are provided with a program for correlating and analyzing data from said first and second data bases for further assessing optimality of allocation of the subscriber lines to the interface modules and providing recommendations on a new power saving arrangement between the modules and the subscriber lines.

10. A method for optimizing the power consumption in access network comprising two or more interface modules serving a plurality of subscriber lines, the method comprising:
   forming a first database based on an inventory information on each of the plurality of subscriber lines, wherein the information stored in the first database enables the retrieval of the Ensured Power Consumption (EPC) of each of the plurality of subscriber line;
   forming a second database based on measurements of one or more parameters indicating the Real Power Consumption (RPC) of each of the plurality of subscriber lines;
   upon analyzing data from both databases, selecting a group of subscriber lines to be served by a certain interface module, wherein each subscriber line in the group is predicted to have a RPC which does not exceed its corresponding EPC by more than a predetermined value.

11. A software product stored on a non-transitory computer readable medium and comprising data and computer implementable instructions for carrying out the method according to claim 10.

12. The method according to claim 10, further comprising allocating the group of subscriber lines to the certain interface module, wherein at least one member of the group of subscriber lines was previously allocated to a different interface module.

13. The method according to claim 10, wherein the second database comprising information regarding on-hook state and off-hook state of each of the plurality of subscriber lines.

14. The method according to claim 10, wherein the group of subscriber lines selected has similar values of the real power consumption RPC of a line.

* * * * *